US005464527A

United States Patent [19]
Ward

[11] Patent Number: 5,464,527
[45] Date of Patent: Nov. 7, 1995

[54] HYDROCRACKING PROCESS FOR PRODUCING MIDDLE DISTILLATES

[75] Inventor: John W. Ward, Yorba Linda, Calif.

[73] Assignee: UOP, Des Plaines, Ill.

[21] Appl. No.: 253,622

[22] Filed: Jun. 3, 1994

Related U.S. Application Data

[63] Continuation of Ser. No. 888,543, May 22, 1992, abandoned.

[51] Int. Cl.[6] .............................. C10G 47/20; B01J 29/10
[52] U.S. Cl. .............................. 208/111; 208/108; 502/65; 502/66; 502/79
[58] Field of Search ................................ 208/108, 111; 502/65, 66, 79

[56] References Cited

U.S. PATENT DOCUMENTS

| | | | |
|---|---|---|---|
| 4,401,556 | 8/1983 | Bezman et al. | 208/111 |
| 4,419,271 | 12/1983 | Ward | 502/65 |
| 4,429,053 | 1/1984 | Ward | 502/65 |
| 4,517,073 | 5/1985 | Ward et al. | 208/111 |
| 4,738,940 | 4/1988 | Dufresne et al. | 502/66 |
| 4,879,019 | 11/1989 | Ward | 208/111 |
| 4,916,096 | 4/1990 | Hoek et al. | 502/66 |
| 4,925,820 | 5/1990 | Hoek et al. | 502/66 |
| 5,047,139 | 9/1991 | Gortsema et al. | 208/111 |
| 5,076,907 | 12/1991 | Occelli | 208/111 |

FOREIGN PATENT DOCUMENTS

| | | |
|---|---|---|
| 0172578 | 2/1986 | European Pat. Off. . |
| 0182216 | 5/1986 | European Pat. Off. . |
| 2014970 | 6/1982 | United Kingdom . |

*Primary Examiner*—Asok Pal
*Assistant Examiner*—Walter D. Griffin
*Attorney, Agent, or Firm*—Thomas K. McBride; Yale S. Finkle; John F. Spears, Jr.

[57] ABSTRACT

The selectivity of a midbarrel hydrocracking process for middle distillates is significantly increased by using a catalyst containing a Y zeolite that has been exchanged with rare earth cations. The rare earth-exchanged Y zeolite has a unit cell size below 24.45 angstroms and/or a water vapor sorptive capacity less than 10 weight percent at 25° C. and a $p/p_o$ value of 0.1.

31 Claims, No Drawings

HYDROCRACKING PROCESS FOR PRODUCING MIDDLE DISTILLATES

CROSS REFERENCES TO RELATED APPLICATIONS

This application is a continuation of U.S. patent application Ser. No. 888,543, filed in the United States Patent and Trademark Office on May 22, 1992, now abandoned.

BACKGROUND OF THE INVENTION

This invention relates to a catalytic hydrocracking process and a catalyst for use therein. The invention is particularly concerned with an improved process for producing middle distillate products using a catalyst highly selective for such products.

Petroleum refiners often produce desirable products such as turbine fuel, diesel fuel, and other hydrocarbon liquids known as middle distillates as well as lower boiling liquids, such as naphtha and gasoline, by hydrocracking a hydrocarbon feedstock derived from crude oil. Feedstocks most often subjected to hydrocracking are gas oils and heavy gas oils recovered from crude oil by distillation. A typical gas oil comprises a substantial proportion of hydrocarbon components boiling above about 700° F., usually at least about 80 percent by weight boiling above 700° F. A typical heavy gas oil has a boiling point range between about 600° F. and 1050° F.

Hydrocracking is generally accomplished by contacting, in an appropriate reaction vessel, the gas oil or other feedstock to be treated with a suitable hydrocracking catalyst under conditions of elevated temperature and pressure in the presence of hydrogen so as to yield a lower overall average boiling point product containing a distribution of hydrocarbon products desired by the refiner. Although the operating conditions within a hydrocracking reactor have some influence on the yield of the products, the hydrocracking catalyst is the prime factor in determining such yields. At the present time, middle distillates are not in high demand relative to gasoline in the United States; however, marketing surveys indicate that there will be an increased demand for middle distillates as the year 2000 approaches. For this reason, refiners have recently been focusing on midbarrel hydrocracking catalysts which selectively produce middle distillate fractions, such as turbine fuel and diesel fuel, that boil in the 300° F. to 700° F. range.

The three main catalytic properties by which the performance of a midbarrel hydrocracking catalyst is evaluated are activity, selectivity, and stability. Activity may be determined by comparing the temperature at which various catalysts must be utilized under otherwise constant hydrocracking conditions with the same feedstock so as to produce a given percentage, normally about 60 percent, of products boiling below 700° F. The lower the activity temperature for a given catalyst, the more active such a catalyst is in relation to a catalyst of higher activity temperature. Selectivity of midbarrel or middle distillate hydrocracking catalysts may be determined during the foregoing described activity test and is measured as the percentage fraction of the 700° F.—product boiling in the desired midbarrel product range, e.g., 300° F. to 700° F. for diesel fuel and 300° F. to 550° F. for turbine fuel. Stability is a measure of how well a catalyst maintains its activity over an extended time period when treating a given hydrocarbon feedstock under the conditions of the activity test. Stability is generally measured in terms of the change in temperature required per day to maintain a 60 percent or other given conversion.

U.S. Pat. Nos. 4,062,809 and 4,419,271, the disclosures of which are hereby incorporated by reference in their entireties, disclose two different types of very effective middle distillate hydrocracking catalysts. The catalyst of U.S. Pat. No. 4,062,809 contains molybdenum and/or tungsten plus nickel and/or cobalt on a support of silica-alumina dispersed in gamma alumina. U.S. Pat. No. 4,419,271 teaches that the catalyst of U.S. Pat. No. 4,062,809 can be improved by adding an aluminosilicate zeolite to the support, thereby producing a catalyst containing molybdenum and/or tungsten and nickel and/or cobalt supported on a mixture of an aluminosilicate zeolite, preferably an ultrahydrophobic zeolite known as LZ-10 zeolite, and a dispersion of silica-alumina in a gamma alumina matrix. The presence of the zeolite in this catalyst increases the activity of the catalyst without significantly affecting the selectivity.

Although the catalysts of the above-discussed patents are highly effective middle distillate hydrocracking catalysts and have proven themselves in commercial environments, there is always a demand for new hydrocracking catalysts with superior overall activity, selectivity, and stability for middle distillate hydrocracking.

SUMMARY OF THE INVENTION

In accordance with the invention, it has now been surprisingly found that the activity and selectivity of middle distillate catalysts comprising one or more hydrogenation components and a Y zeolite having either a unit cell size below about 24.45 angstroms or a water vapor sorptive capacity less than about 10 weight percent at 25° C. and $p/p_o$ value of 0.10 can be substantially improved by exchanging the Y zeolite with rare earth-containing cations. Under typical hydrocracking conditions, including elevated temperature and pressure and the presence of hydrogen, such catalysts are highly effective for converting gas oil and other hydrocarbon feedstocks to a product of lower average boiling point and lower average molecular weight, which product contains a relatively large proportion of components boiling in the midbarrel range of 300° F. to 700° F. The hydrocracking catalyst normally contains one or more hydrogenation components, such as one or more Group VIB or Group VIII metal components, in combination with the rare earth-exchanged Y zeolite and also usually contains an amorphous, inorganic refractory oxide, such as a dispersion of silica-alumina particles in an alumina matrix, and a porous, inorganic refractory oxide binder, such as alumina. As used herein "$p/p_o$" represents the water vapor partial pressure to which the Y zeolite is exposed divided by the water vapor partial pressure at 25° C.

Preliminary tests indicate that the catalyst of the invention, when used in hydrocracking to produce middle distillate products such as diesel fuel and turbine fuel, has a somewhat higher activity and a surprisingly greater selectivity than other middle distillate catalysts now commercially available for use in midbarrel hydrocracking processes. These tests surprisingly indicate that, at 60 percent conversion, greater than about 86 volume percent of the 700° F.— product, typically greater than about 88 volume percent, boils in the range between 300° F. and 700° F. while greater than about 80 volume percent, frequently greater than about 83 volume percent, boils in the range between 300° F. and 550° F.

DETAILED DESCRIPTION OF THE INVENTION

The hydrocracking process of the invention is directed to the production of high yields of middle distillates such as diesel fuel, which, as defined herein, boils in the 300° F. to 700° F. range, and turbine fuel, which, as defined herein, boils in the 300° F. to 550° F. range. These high yields are obtained utilizing a catalyst containing one or more hydrogenation components in combination with a Y zeolite having a unit cell size below about 24.45 angstroms and/or a water vapor sorptive capacity less than about 10 weight percent at 25° C. and $p/p_o$ value of 0.10, which zeolite has been exchanged with rare earth-containing cations. The Y zeolite preferably has an overall silica-to-alumina mole ratio less than 6.0, usually between about 4.5 and 5.6. Preferably, the catalyst also comprises a porous, inorganic refractory oxide binder and an amorphous, inorganic refractory oxide diluent, which may or may not have catalytic activity.

The Y zeolite which comprises the midbarrel hydrocracking catalyst of the invention has either (1) a unit cell size less than about 24.45 angstroms or (2) a sorptive capacity for water vapor at 25° C. and a $p/p_o$ value of 0.10 of less than 10 weight percent, preferably less than 5 weight percent. Preferred Y zeolites meet both of the foregoing requirements. The term "Y zeolite" as employed herein is meant to encompass all crystalline zeolites having either the essential X-ray powder diffraction pattern set forth in U.S. Pat. No. 3,130,007 or a modified Y zeolite having an X-ray powder diffraction pattern similar to that of U.S. Pat. No. 3,130,007 but with the d-spacings shifted somewhat due, as those skilled in the art will realize, to cation exchanges, calcinations, etc., which are generally necessary to convert the zeolite into a catalytically active and stable form. The present invention requires a Y zeolite having either or both of the two properties mentioned above, such Y zeolites being modified Y zeolites in comparison to the Y zeolite taught in U.S. Pat. No. 3,130,007.

The Y zeolites used in the catalyst of the invention are large pore zeolites having an effective pore size greater than 7.0 angstroms. Since some of the pores of the Y zeolites are relatively large, the zeolites allow molecules relatively free access to their internal structure. Thus, the Y zeolites useful in the composition of the invention generally have a low Constraint Index, typically below 1.0, preferably below 0.75, and usually below about 0.5.

The preferred Y zeolite for use in the hydrocracking catalyst of the invention is a UHP-Y zeolite, an ultrahydrophobic Y zeolite, that has been exchanged with rare earth-containing cations. The composition and properties of UHP-Y zeolites are disclosed in U.S. Pat. No. 4,401,556 herein incorporated by reference in its entirety. See also Great Britain Patent 2 014 970 B which is also herein incorporated by reference in its entirety. UHP-Y zeolites and similar zeolites are, in essence, produced by a four step procedure in which a Y zeolite in the alkali metal form (usually sodium) and typically having a unit cell size of about 24.65 angstroms is cation exchanged with ammonium ions, calcined in the presence of water vapor (preferably in the presence of at least 0.2 psia water vapor, even more preferably at least 1.0 psia water vapor, and more preferably still, at least 10 psia water vapor, and most preferably of all, an atmosphere consisting essentially of or consisting of steam) so as to produce a unit cell size in the range of 24.40 to 24.64 angstroms, preferably 24.42 to 24.62 angstroms, then ammonium exchanged once again, and then calcined again in the presence of sufficient water vapor (preferably in an atmosphere consisting essentially of steam, and most preferably consisting of steam) so as to yield a unit cell size below 24.40, and most preferably no more than 24.35 angstroms. The first ammonium exchange step typically reduces the sodium content of the starting sodium Y zeolite from a value usually greater than about 8.0 weight percent, usually between 10 and 13 weight percent, calculated as $Na_2O$, to a value in the range between about 0.6 and 5 weight percent, while the second ammonium exchange further reduces the sodium content to less than about 0.5 weight percent, usually less than 0.3 weight percent. It will be seen from the above-discussed manufacturing procedure that UHP-Y zeolites differ from the Y zeolite taught in U.S. Pat. No. 3,929,672 by the addition of the final steam calcination step, some of the zeolites of said patent being known under the designations Y-82 or LZY-82 and Y-84 or LZY-84.

"UHP-Y" zeolites are defined herein as zeolite aluminosilicates having an overall silica-to-alumina mole ratio greater than 4.5, the essential X-ray powder diffraction pattern of zeolite Y, a unit cell size or dimension $a_o$ of less than 24.45 angstroms, a surface area of at least 300 $m^2/g$ (BET), a sorptive capacity for water vapor at 25° C. and a $p/p_o$ value of 0.10 of less than 10 weight percent, and a Residual Butanol Test value of not more than 0.40 weight percent. Preferred UHP-Y zeolites have one or more of the following properties: an overall silica-to-alumina mole ratio from 4.5 to 35; a surface area of at least 350 $m^2/g$, and a sorptive capacity for water vapor at 25° C. and a $p/p_o$ value of 0.10 of less than 5 weight percent. Especially preferred are UHP-Y zeolites having an overall silica-to-alumina mole ratio of 4.5 to 9 and/or a sorptive capacity for water vapor at 25° C. and a $p/p_o$ value of 0.10 of less than 4 weight percent. Although UHP-Y zeolites having silica-to-alumina mole ratios below 6.0 may be most preferred, UHP-Y zeolites that have been treated with a mineral acid to remove aluminum and thereby increase their overall silica-to-alumina molar ratio may also be used. Such acid treated UHP-Y zeolites are discussed in detail in U.S. Pat. No. 5,047,139, the disclosure of which is herein incorporated by reference in its entirety.

The more preferred UHP-Y zeolites for use in the present invention have a unit cell size or dimension less than about 24.40 angstroms, and even more preferably no more than 24.35 angstroms. LZ-10 zeolite is the most preferred UHP-Y zeolite, LZ-10 zeolite being available from UOP. LZ-10 zeolite usually has a unit cell size or dimension at or above 24.20 angstroms, preferably between 24.20 and 24.40, and most preferably between about 24.25 and 24.35 angstroms, and has a water vapor sorptive capacity at 4.6 mm water vapor partial pressure and 25° C. less than 8.0 percent by weight of the zeolite. See U.S. Pat. No. 4,419,271 which previously has been incorporated by reference in its entirety.

As discussed above, the Y zeolites used in the catalyst of the invention are typically made by a process which involves two ammonium exchange steps to reduce the sodium or other alkali metal content of the starting Y zeolite to a value less than 0.5 weight percent sodium, usually less than about 0.3 weight percent, calculated as $Na_2O$. These zeolites of reduced sodium content possess catalytic cracking activity and can be used as components of hydrocracking catalysts. In accordance with this invention, it has now been found that the selectivity of catalysts containing these Y zeolites for middle distillate production can be substantially increased by ion exchanging the Y zeolites of reduced sodium content with rare earth-containing cations.

The rare earth metals selected for exchange into the zeolite may be any one or any combination of the lanthanide elements having atomic numbers according to the Periodic Table of Elements between 57 and 71. Thus, the metals suitable for ion exchange herein include lanthanum, cerium, praseodymium, neodymium, samarium, europium, gadolinium, terbium, dysprosium, holmium, erbium, thulium, ytterbium, and lutetium. In the most preferred embodiment of the invention, a mixture of rare earth cations is introduced into the zeolite, with the mixture often containing rare earth metals in a distribution similar to that of the rare earth ore (e.g., bastnasite, monazite, xenotime, and the like) from which the metals were derived.

There are many known methods by which one can exchange rare earth cations for sodium and other cations, particularly hydrogen ions, in a crystalline aluminosilicate Y zeolite. The most usual way is to contact the zeolite with an aqueous solution containing multivalent cations of the rare earth element or elements to be exchanged into the zeolite. Most often, the solution contains more than about 20 grams per liter of rare earth metal cations (calculated as $RE_2O_3$ where RE is the sum of all rare earth metals under consideration, regardless of whether any one or more of such metals actually forms a trioxide of equivalent formula), and the contacting is usually accomplished by immersing the zeolite into the ion-exchange solution and stirring at ambient temperature or above but usually at no more than about 100° C. If desired, the solution may also contain ammonium ions, and the solution may further contain any of a number of anions that will not interfere with the cation exchange, e.g. chloride, nitrate, sulfate, etc.

For best results, the ion exchange is performed in a manner such that the rare earth-exchanged zeolite contains at least about 1 percent, preferably at least 2 percent, and usually between about 4 and 6 percent, by weight of rare earth metals, calculated as $RE_2O_3$. Although a small proportion of the rare earth metals exchanged into the zeolite will replace some of the residual sodium ions at exchange sites in the zeolite, the largest proportion will exchange with hydrogen ions and/or ammonium ions because of their relatively high concentration versus the low concentration, usually below 0.3 weight percent, calculated as $Na_2O$, of sodium cations present. Sometimes, only a single immersion of the zeolite into the ion exchange solution will be sufficient for the necessary exchange. However, in some cases it may be necessary to carry out the ion exchange by several immersions into a solution containing rare earth metal cations, or by immersion serially into several solutions of differing rare earth element content, or by other known methods for introducing rare earth metal cations into a zeolite.

After the ion exchange described above, the rare earth-containing Y zeolite is dried and then embodied into support particles which serve to carry one or more hydrogenation components. In the preferred method, this is accomplished by combining the rare earth-exchanged zeolite with (1) a material such as an alumina hydrogel or peptized, Catapal alumina, which, upon calcination, will yield a porous, inorganic refractory oxide binder or (2) with a material which itself is a porous, inorganic refractory oxide binder, for example, alumina, silica-alumina, silica magnesia, a clay, such as kaolin, as well as combinations of such materials. A sufficient amount of the Y zeolite is normally used such that the support comprises between about 1 and about 50 weight percent, preferably between about 2 and 30 weight percent, more preferably between about 5 and 20 weight percent, of the rare earth-exchanged Y zeolite. Perhaps the most convenient method for physically integrating the zeolite and the binder is to comull the porous, inorganic refractory oxide binder or precursor material with the zeolite, and subsequently extrude the comulled material through a die having small openings therein of desired cross-sectional size and shape, e.g., circle, trilobal clover-leaf, quadralobal clover leafs, etc., breaking or cutting the extruded matter into appropriate lengths, e.g., 1/16 to 3/4 inch, drying the extrudates, and then calcining at a temperature between 800° F. and 1200° F. to produce a material suitable for use in high temperature hydrocracking reactions. At present it is preferred that the support be produced in cylindrical form; however, as stated above, other cross-sectional shapes are possible, such as cloverleafs of polylobal design, for example, trilobal or quadralobal shapes, as shown, for example, in FIGS. 8 and 10, respectively, in U.S. Pat. No. 4,028,227 herein incorporated by reference in its entirety.

It will be understood, of course, in the foregoing description that the porous, inorganic refractory oxide is used as a binder material to hold the rare earth-exchanged zeolite particles together in the support, and accordingly, if desired, other materials can also be incorporated into the comulled mixture, including for example, amorphous, inorganic refractory oxide diluents, which may or may not possess some type of catalytic activity. Examples of preferred diluents are those having cracking activity such as alumina, silica-alumina and a heterogeneous dispersion of finely divided silica-alumina particles in an alumina matrix, which dispersion is described in detail in U.S. Pat. Nos. 4,062,809 and 4,419,271. Additionally and alternatively, hydrogenation component precursors can also be comulled into the mixture, as will be discussed in more detail hereinafter.

The heterogeneous dispersion of finely divided silica-alumina in an alumina matrix mentioned above is a preferred diluent for use in the catalyst and may be prepared by comulling an alumina hydrogel with a silica-alumina cogel in hydrous or dry form. Alternatively, the alumina hydrogel may be comulled with a "graft copolymer" of silica and alumina that has been prepared, for example, by first impregnating a silica hydrogel with an aluminum salt and then precipitating alumina gel in the pores of the silica hydrogel by contact with ammonium hydroxide. In the usual case, the cogel or copolymer is mixed or mulled with the alumina hydrogel such that the cogel or copolymer comprises between about 5 and 75 weight percent, preferably 20 to 65 weight percent, of the mixture. The overall silica content of the resulting dispersion on a dry basis is normally between about 5 and about 75 weight percent, preferably between about 15 and about 45 weight percent. Typically, the silica-alumina is dispersed in a gamma alumina matrix.

It will be further understood that producing the catalyst support in extrudate form, while certainly the most highly preferred method, is still but one option available to those skilled in the art. The catalyst support may also be produced in tablet, granules, spheres, and pellets as desired, by any known method for combining zeolites with porous, inorganic refractory oxide components. Regardless of how the support particles are produced, they typically contain between 10 and 40, preferably from 15 to 30, weight percent binder and between 25 and 90, usually between 40 and 80, weight percent amorphous diluent.

After the catalyst support particles are produced, they are converted to catalyst particles by compounding, as by impregnation of the particles, with one or more precursors of at least one catalytically active hydrogenation metal component. The impregnation may be accomplished by any method known in the art, including spray impregnation wherein a solution containing the hydrogenation metal precursors in dissolved form is sprayed onto the support particles. Another method involves soaking the support particles in a large volume of the impregnation solution. Yet another method is the pore volume or pore saturation technique wherein the support particles are introduced into an impregnation solution of volume just sufficient to fill the pores of the support. On occasion, the pore saturation technique may be modified so as to utilize an impregnation solution having a volume between 10 percent less and 10 percent more than that which would just fill the pores. If the active metal precursors are incorporated by impregnation, a subsequent or second calcination, as for example at temperatures between 700° F. and 1200° F., will convert the metals to their respective oxide forms. In some cases, calcinations may follow each impregnation of individual active metals.

Alternative methods of introducing the active metal components into the catalyst support include (1) mixing an appropriate solid or liquid containing the metal components with the materials to be extruded through the die and (2) impregnating the materials to be extruded with the desired metal components prior to carrying out the extrusion. Such methods may prove less expensive and more convenient than the impregnation methods discussed above and will also result in the active hydrogenation components being intimately mixed with the components of the support.

Hydrogenation components suitable for incorporation into the extruded catalyst support particles comprise metals selected from Group VIII and/or Group VIB of the Periodic Table of Elements. As used herein "Periodic Table of Elements" refers to the version found in the inside front cover of the *Handbook of Chemistry and Physics,* 65th Edition, published in 1984 by the Chemical Rubber Company, Cleveland, Ohio. Preferred hydrogenation components comprise metals selected from the group consisting of platinum, palladium, cobalt, nickel, tungsten, chromium, and molybdenum. Preferably, the catalyst contains at least one Group VIII metal component and at least one Group VIB metal component, with cobalt or nickel and molybdenum or tungsten being preferred combinations of active components and nickel and tungsten being most preferred. The catalyst typically contains up to about 15, usually between about 1 and 10 weight percent, preferably between 2 and 8 weight percent, of a non-noble Group VIII metal, calculated as the monoxide, and up to 30, usually from about 2 to 28 weight percent, and preferably between about 10 and 25 weight percent, of the Group VIB metal, calculated as the trioxide. If the hydrogenation component comprises a noble metal such as platinum or palladium, it is generally desired that the catalyst contain between about 0.2 and about 10 weight percent, preferably between about 0.30 and 2.0 weight percent, calculated as the metal.

By the foregoing procedures or their equivalents, catalysts with the hydrogenation metals present in the oxide form are prepared as particulates. The finished hydrocracking catalysts typically have a BET surface area ranging between about 100 and 300 m²/g. When used to selectively produce middle distillates, these catalysts usually comprise (1) between about 1 and 40 weight percent, preferably between about 3 and 20 weight percent, rare earth-containing Y zeolite having a unit cell size below about 24.45 angstroms and/or a water vapor sorptive capacity less than about 10 weight percent at 25° C. and $p/p_o$ value of 0.10, (2) between about 5 and 40 weight percent porous, inorganic refractory oxide binder, preferably between about 10 and 25 weight percent, (3) between about 20 and about 90 weight percent amorphous, inorganic refractory oxide diluent, such as a dispersion of silica-alumina particles in a gamma alumina matrix, preferably between about 30 and 80 weight percent, (4) between about 2 and 28 weight percent Group VIB metal hydrogenation component, preferably between about 10 and 25 weight percent, and (5) between about 0.2 and 15 weight percent Group VIII hydrogenation metal component, preferably between 2 and 8 weight percent.

Catalysts prepared in the oxide form as described above are generally converted to the sulfide form for hydrocracking purposes. This can be accomplished by presulfiding the catalyst prior to use at an elevated temperature, e.g., 300° to 700° F., with, for example, a mixture consisting of 10 volume percent $H_2S$ and 90 volume percent $H_2$. The catalyst can be presulfided ex situ by various sulfiding processes; as an illustration, see "Sulficat®: Off-Site Presulfiding of Hydroprocessing Catalysts from Eurecat" by J. H. Wilson and G. Berrebi, *Catalysis 87, Studies in Surface Science and Catalysts* Vol. 38, Elsevier Science Publishers B. V., 1988, pages 393–398. Alternatively, the sulfiding is accomplished in situ, i.e., by using the catalyst in the oxide form to hydrocrack a hydrocarbon feedstock containing sulfur compounds under hydrocracking conditions, including elevated temperature and pressure and the presence of hydrogen.

The catalysts described above are useful in the conversion of a wide variety of hydrocarbon feedstocks via hydrocracking to more valuable hydrocarbon products of lower average boiling point and lower average molecular weight, which products typically boil in the range between about 300° F. and about 700° F. The feedstocks that may be subjected to hydrocracking by the process of the invention include mineral oils and synthetic oils such as shale oil, oil derived from tar sands, coal liquids, and the like. Examples of appropriate feedstocks for hydrocracking include atmospheric gas oils, vacuum gas oils, and catalytic cracker cycle oils. Preferred hydrocracking feedstocks include gas oils and other hydrocarbon fractions having at least 50 weight percent of their components boiling above 700° F. Such feedstocks typically contain individual concentrations of nickel, vanadium, iron and copper less than about 8.0 ppmw, preferably less than about 5.0 ppmw, and most preferably less than about 1.0 ppmw. Normally, heavy hydrocarbon oils such as a heavy crude oil, a reduced crude oil, vacuum distillation residues and similar heavy materials are not suitable feedstocks for the process of the invention.

Usually, the feedstocks described above are hydrotreated before being subjected to the hydrocracking process of the invention. The hydrotreating is performed in conjunction with hydrocracking, usually by a method referred to as "integral operation." In this process, the hydrocarbon feedstock is introduced into a catalytic hydrotreating zone wherein, in the presence of a suitable catalyst and under suitable conditions, including an elevated temperature (e.g., 400° to 1000° F.) and an elevated pressure (e.g., 100 to 5000 p.s.i.g.) and with hydrogen as a reactant, the organonitrogen components and the organosulfur components contained in the feedstock are converted to ammonia and hydrogen sulfide, respectively. Suitable hydrotreating catalysts include zeolite- or sieve-free, particulate catalysts comprising a Group VIII metal component and a Group VIB metal component on a porous, inorganic, refractory oxide support most often composed of alumina. The entire effluent removed from the hydrotreating zone is subsequently treated in the hydrocracking zone maintained under suitable conditions of elevated temperature, pressure, and hydrogen partial pressure, and containing the hydrocracking catalyst of the invention. Usually, the hydrotreating and hydrocracking zones in integral operation are maintained in separate reactor vessels, but, on occasion, it may be advantageous to employ a single, downflow reactor vessel containing one or more upper beds of the hydrotreating catalyst particles and one or more lower beds of the hydrocracking catalyst particles. Examples of integral operation may be found in U.S. Pat. Nos. 3,159,564, 3,655,551, 4,040,944, and 4,584,287 all of which are herein incorporated by reference in their entireties. In some cases, the effluent from the hydrocracking zone is subjected to hydrotreating in a manner similar to that described above in order to remove trace mercaptans from the product.

The catalyst of the invention is usually employed as a fixed bed of catalytic extrudates in a hydrocracking reactor into which hydrogen and the feedstock are introduced and passed in a downwardly direction. The reactor vessel is maintained at conditions so as to convert the feedstock into the desired product, which is normally a hydrocarbon product containing a substantial portion of turbine fuel and diesel fuel components boiling in the range between 300° F. and 700° F. In general, the temperature of the reaction vessel is maintained between about 450° F. and about 850° F., preferably between about 500° F. and 800° F. The pressure normally ranges between about 750 p.s.i.g. and about 3500 p.s.i.g., preferably between about 1000 and about 3000 p.s.i.g. The liquid hourly space velocity (LHSV) is typically between about 0.3 and 5.0, preferably between about 0.5 and 3.0, reciprocal hours. The ratio of hydrogen gas to feedstock utilized usually ranges between 1,000 and about 10,000 standard cubic feet per barrel, preferably between about 2,000 and 8,000 standard cubic feet per barrel, as measured at 60° C. and 1 atmosphere.

The typical gas oil feedstock contains no more than about 35 volume percent, usually less than 15 volume percent, constituents boiling in the 300° F. to 700° F. range. When middle distillates are desired, the hydrocracking operation conditions are chosen so that at least 80 volume percent, preferably at least 86 volume percent, and most preferably at least 88 volume percent, of the 700° F.—product boils in the range between 300° F. and 700° F. Usually, the 700° F.—product contains greater than 75 volume percent, preferably at least 80 volume percent, and more preferably greater than 83 volume percent, hydrocarbons boiling in the range between 300° F. and 550° F.

Based on presently available data, the catalyst of the present invention as compared to a commercial middle distillate hydrocracking catalyst containing a non-rare earth-exchanged LZ-10 zeolite having a unit cell dimension of 24.30 angstroms provides for enhanced results when used to selectively produce turbine and diesel fuel. In particular, the catalyst of the invention provides for a higher activity and significant increases in the yield of hydrocarbon distillates boiling in the 300° F. to 550° F. range and the 300° F. to 700° F. range. These achievements, and others, are proven in the following example which is provided for illustrative purposes and not to limit the invention as defined by the claims.

EXAMPLE

Catalyst 1

Catalyst 1, a catalyst of the invention, was prepared by mixing 10 weight percent of a rare earth-exchanged LZ-10 zeolite, 70 weight percent of a dispersion of silica-alumina particles in a gamma alumina matrix (Aero 5545 obtained from Criterion Catalyst Company L. P.), which dispersion contained about 55 weight percent alumina and about 45 weight percent silica, and 20 weight percent peptized Catapal alumina binder. The mixture was mulled and then extruded through a 1/16-inch cylindrical die to form cylindrical extrudates that were cut into 1/8 to 1/2 inch lengths. The extrudates were dried at 100° C. and then calcined at 900° F. The dried and calcined extrudates were then impregnated by the pore saturation method with an aqueous solution containing nickel nitrate and ammonium metatungstate in sufficient quantities such that, after the impregnated extrudates were dried at 100° C. and calcined at 900° F., the resultant catalyst particles contained about 5 weight percent nickel, calculated as NiO, and about 22 weight percent tungsten, calculated as $WO_3$, on a support consisting of 10 weight percent rare earth-exchanged LZ-10 zeolite, 70 weight percent dispersion, and 20 weight percent alumina binder.

The LZ-10 zeolite used to make Catalyst 1 had a unit cell size of 24.30 angstroms, an effective pore size above about 7.0 angstroms and an overall silica-to-alumina mole ratio of about 5.2. The LZ-10 zeolite, which was obtained from UOP, was exchanged with rare earth cations by slurrying the zeolite in a solution of mixed rare earth chlorides. One thousand (1,000) grams of the LZ-10 zeolite were stirred at room temperature for one hour with a solution containing 100 grams of rare earth chlorides in 2,500 ml of water. The slurry was filtered and the resultant solids washed with about 5 liters of water. The process was then repeated once and the solid product was dried at 110° C. overnight. The rare earth chloride solution contained a mixture of rare earth elements in the following proportions calculated as the oxides: 50 weight percent $CeO_2$; 33 weight percent $La_2O_3$; 12 weight percent $Nd_2O_3$; 4 weight percent $Pr_6O_{11}$; and 1 weight percent other rare earth elements, calculated as $RE_2O_3$. After the rare earth exchange was completed, the LZ-10 zeolite contained about 5.1 weight percent rare earths calculated as $RE_2O_3$.

Catalyst 2

Catalyst 2, a comparative catalyst, was prepared similarly to Catalyst 1 except that, prior to mixing the LZ-10 zeolite with the other catalyst components, the zeolite was exchanged with aluminum cations instead of rare earth cations. The aluminum ion exchange was carried out by slurrying 1,000 grams of the LZ-10 zeolite with a solution prepared by dissolving 100 g of aluminum ammonium sulfate in 2,000 ml of water. The slurry was stirred at room temperature for one hour after which time it was filtered and washed and the procedure repeated. The solid product was then dried at 110° C. overnight. The finished catalyst contained the nickel and tungsten in the proportions above specified for Catalyst 1 on a support consisting of 10 weight percent aluminum-exchanged LZ-10 zeolite, 70 weight percent dispersion of silica-alumina particles in a gamma alumina matrix, and 20 weight percent alumina binder. After the aluminum cation exchange, the LZ-10 zeolite contained about 3.1 weight percent more aluminum, calculated as $Al_2O_3$, than it contained prior to the aluminum cation exchange.

Catalyst 3

Catalyst 3 was a sample of a commercial middle distillate hydrocracking catalyst obtained from UOP. It was prepared similarly to Catalysts 1 and 2 except the LZ-10 zeolite was not rare earth- or aluminum-exchanged and contained no rare earth or aluminum cations at exchange sites. The catalyst contained about 5 weight percent nickel, calculated as NiO, and about 22 weight percent tungsten, calculated as $WO_3$ on a support consisting of 10 weight percent LZ-10 zeolite, 70 weight percent dispersion of silica-alumina particles in a gamma alumina matrix, and 20 weight percent alumina binder.

Each of the above-described three catalysts was presulfided by passing a gas stream consisting of 10 volume percent hydrogen sulfide and the balance hydrogen through a bed of the catalyst at a temperature initially of about 300° F. and slowly increased to 700° F. and held at that temperature for about one hour.

The three catalysts were then tested for activity and selectivity in middle distillate hydrocracking using a non-hydrotreated light Arabian vacuum gas oil having an API gravity of 23°, an initial boiling point of 494° F., a final boiling point of 1048° F. and a 50 percent boiling point of 844° F., with about 20 volume percent boiling below about 786° F. and 5 volume percent boiling below 741° F., as determined by a modified ASTM D1160 distillation. The gas oil, which contained about 0.085 weight percent nitrogen, calculated as the element, and 2.1 weight percent sulfur, calculated as the element, was passed on a once-through basis through an isothermal reactor containing about 140 ml of the catalyst mixed with 95 ml of six to eight mesh quartz. The reactor was operated at a liquid hourly space velocity (LHSV) of 1.0 reciprocal hour, a total pressure of 2,000 psig and a once-through hydrogen flow rate of 10,000 standard cubic feet per barrel. The temperature of the reactor was adjusted to provide a 60 volume percent conversion to materials boiling below 700° F. The results of these tests are set forth in Table I below:

TABLE I

| Catalyst Designation | Composition of Support (Wt. %) | Activity (°F.) Reactor Temp. to Provide 60% Conversion to 700° F.- | Selectivity (Vol. % of 700° F.-Product) | |
|---|---|---|---|---|
| | | | Trubine 300–500° F. | Diesel 300–700° F. |
| 1 | 70% silica-alumina in alumina 20% binder 10% rare earth-exchanged LZ-10 zeolite | 748 | 85.1 | 89.8 |
| 2 | 70% silica-alumina in alumina 20% binder 10% aluminum-exchanged LZ-10 zeolite | 742 | 76.7 | 84.1 |
| 3 | 70% silica-alumina in alumina 20% binder 10% LZ-10 zeolite | 754 | 79.5 | 85.6 |

As can be seen from the data in Table I, the catalyst of the invention, i.e., Catalyst 1, is 6° F. (748° F.–754° F.) more active than the commercial catalyst, i.e., Catalyst 3. From kinetic considerations, it is known that an activity differential of about 30° F. of one catalyst over another roughly translates into a doubling in catalytic activity. Thus, a 6° F. differential between Catalyst 1 and Catalyst 3 represents about a 20 percent improvement in activity for Catalyst 1 and means that this catalyst can be used for hydrocracking a given feedstock under the same operating conditions as the commercial catalyst but at a feed rate 20 percent higher. Alternatively, the catalyst of the invention could be used to produce the same conversion as the commercial catalyst at the same feed rate but initially at a temperature 6° F. lower.

In addition to possessing an increased activity over the commercial catalyst, Catalyst 1 is also 5.6 volume percent (85.1–79.5) more selective for turbine fuel boiling in the range between 300° F. and 550° F. and 4.2 volume percent (89.8–85.6) more selective for diesel fuel boiling in the range of 300° F. to 700° F. Such increases in selectively are extremely significant in view of the fact a 4.0 percent increase is considered commercially to be very significant because substantially more of the feed is converted to the desired product and less to lower valued products. For example, in a once-through hydrocracking process which yields 14,000 barrels per day of diesel fuel, a 4.2 percent increase in selectivity associated with Catalyst 1 will yield 588 more barrels per day and approximately 185,000 more barrels per year of the desired product. Assuming diesel fuel is priced at $40 per barrel, this increase in selectively is worth almost 7.5 million dollars per year to the refiner—a significant amount of money.

A comparison of Catalyst 1 with Catalyst 2, which differs from Catalyst 1 in that the LZ-10 zeolite is exchanged with aluminum cations instead of rare earth cations, indicates that Catalyst 2 is 6° F. more active (742° F.–748° F.) then Catalyst 1. However, Catalyst 1 is surprisingly and unexpectedly much more selective. According to the data, Catalyst 1 yields 8.4 volume percent (85.1–76.7) more turbine fuel boiling in the range between 300° F. and 550° F. and 5.7 volume percent (89.8–84.1) more diesel fuel boiling in the range between 300° F. and 700° F. These selectivity differences are much greater than those observed between Catalyst 1 and the commercial catalyst and clearly indicate that the selectivity differences between Catalysts 1 and 2 are commercially very significant. If an analysis similar to that set forth above for the selectivity differences between Catalyst 1 and the commercial catalyst, i.e., Catalyst 3, is followed, the use of Catalyst 1 in lieu of Catalyst 2 results in an income of about 10 million dollars per year more to the refiner. The fact that the presence of the multivalent rare earth cations in the LZ-10 zeolite of Catalyst 1 would yield such significant and surprising increases in selectivity of both turbine and diesel fuel over a similar catalyst in which the LZ-10 zeolite is exchanged with multivalent aluminum cations is unexpected.

Although the invention has been primarily described in conjunction with an example and by references to embodiments thereof, it is evident that many alternatives, modifications, and variations will be apparent to those skilled in the art in light of the foregoing description. Accordingly, it is intended to embrace within the invention all such alternatives, modifications, and variations that fall within the spirit and scope of the appended claims.

I claim:

1. A hydrocracking process for selectively producing middle distillate products which comprises contacting a hydrocarbon feedstock with a hydrocracking catalyst under hydrocracking conditions in the presence of hydrogen so as to produce a product of lower average boiling point, said catalyst comprising:

(a) one or more hydrogenation components; and
   (b) a rare earth-exchanged Y zeolite comprising at least 2 wt. % rare earth and having a unit cell size of 24.35 angstroms or below and a water vapor sorptive capacity less than about 10 weight percent at 25° C. and a $p/p_o$ value of 0.10, wherein said rare earth-exchanged Y zeolite is prepared by exchanging a Y zeolite having a unit cell size of 24.35 angstroms or below with rare earth-containing cations, and said Y zeolite contains less than 0.5 weight percent sodium, calculated as $Na_2O$, prior to said rare earth exchange.

2. A hydrocracking process as defined by claim 1 wherein said catalyst further comprises an amorphous, inorganic refractory oxide.

3. A hydrocracking process as defined by claim 2 wherein said amorphous, inorganic refractory oxide comprises a dispersion of silica-alumina particles in an alumina matrix.

4. A hydrocracking process as defined by claim 1 wherein said lower average boiling point product contains components boiling below 700° F. and greater than about 86 volume percent of said components boil in the range between 300° F. and 700° F.

5. A hydrocracking process as defined by claim 3 wherein said catalyst further comprises an alumina binder and contains both a nickel hydrogenation component and a tungsten hydrogenation component, said Y zeolite is LZ-10 zeolite, and greater than 85 volume percent of the hydrocarbons in the 700° F.—boiling fraction of said lower average boiling point product boils in the range between 300° F. and 700° F.

6. A hydrocracking process as defined by claim 1 wherein said rare earth-exchanged Y zeolite has an overall silica-to-alumina mole ratio less than about 6.0.

7. A hydrocracking process for selectively producing middle distillate products which comprises contacting a hydrocarbon feedstock under hydrocracking conditions in the presence of hydrogen with a hydrocracking catalyst comprising one or more hydrogenation components and a rare earth-exchanged Y zeolite prepared by a process comprising the steps of:

(a) partially ammonium exchanging a sodium Y zeolite having an overall silica-to-alumina mole ratio less than about 6.0;
   (b) calcining the resultant zeolite in the presence of water vapor;
   (c) ammonium exchanging a second time;
   (d) calcining the zeolite from step (c) in the presence of water vapor under conditions such that the unit cell size of the zeolite is reduced to a value less than 24.35 angstroms; and
   (e) cation exchanging the zeolite from step (d), which zeolite has a silica-to-alumina mole ratio less than about 6.0 and contains less than 0.5 weight percent sodium, calculated as $Na_2O$, with rare earth-containing cations.

8. A hydrocracking process as defined by claim 7 wherein said rare earth exchanged Y zeolite is prepared such that in step (a) the sodium Y zeolite is reduced in sodium content to between about 0.6 and 5 weight percent, calculated as $Na_2O$, in step (b) a steam atmosphere is employed and the unit cell size of the zeolite is reduced to a value between about 24.40 and 24.64 angstroms, and in step (c) the ammonium exchange reduces the sodium content to below about 0.5 weight percent calculated as $Na_2O$.

9. A hydrocracking process as defined by claim 8 wherein the zeolite in step (d) has a final unit cell size between about 24.20 and 24.35 angstroms.

10. A hydrocracking process as defined by claim 9 wherein said hydrocracking catalyst further comprises a dispersion of silica-alumina particles in a gamma alumina matrix.

11. A hydrocracking process as defined by claim 10 wherein at least about 80 volume percent of the components in said hydrocarbon feedstock boil above about 700° F. and said hydrocracking process is carried out under conditions such that the products produced which boil below 700° F. contain at least about 86 volume percent components boiling in the range between 300° F. and 700° F.

12. A hydrocracking process as defined by claim 11 wherein said catalyst contains a Group VIII metal hydrogenation component selected from the group consisting of nickel, cobalt, and the oxides and sulfides thereof and a Group VIB metal hydrogenation component selected from the group consisting of molybdenum, tungsten, and the oxides and sulfides thereof.

13. A hydrocracking process as defined by claim 8 wherein step (e) is carried out so as to introduce a mixture of rare earth cations into said zeolite, said mixture containing cerium, lanthanum, praseodymium, and neodymium cations.

14. A hydrocracking process which comprises contacting a hydrocarbon feedstock with a catalyst under hydrocracking conditions in the presence of hydrogen so as to produce a product of lower average boiling point, said catalyst comprising:

(a) one or more hydrogenation components;
   (b) a porous, inorganic refractory oxide binder; and
   (c) a rare earth-exchanged Y zeolite having an overall silica-to-alumina mole ratio less than about 6.0, a unit cell size between 24.20 and 24.35 angstroms and a water vapor sorptive capacity less than about 10 weight percent at 25° C. and a $p/p_o$ value of 0.10, wherein said rare earth-exchanged Y zeolite is prepared by exchanging a Y zeolite having a unit cell size below 24.35 angstroms with rare earth-containing cations, and said Y zeolite contains less than about 0.5 weight percent sodium, calculated as $Na_2O$, prior to said rare earth exchange.

15. A hydrocracking process as defined by claim 14 wherein said rare earth-exchanged Y zeolite has a water vapor sorptive capacity less than about 5 weight percent of said zeolite at 25° C. and a $p/p_o$ value of 0.10.

16. A hydrocracking process as defined by claim 15 wherein said hydrogenation components comprise components selected from the group consisting of Group VIB and Group VIII metals and compounds thereof.

17. A hydrocracking process as defined by claim 16 wherein said Group VIB metal hydrogenation component is selected from the group consisting of molybdenum, tungsten, and the oxides and sulfides thereof and said Group VIII metal hydrogenation component is selected from the group consisting of nickel, cobalt, and the oxides and sulfides thereof.

18. A hydrocracking process as defined by claim 14 wherein said lower average boiling point product contains components boiling below 700° F. and greater than about 88 volume percent of said components boil in the range between about 300° F. and 700° F.

19. A hydrocracking process as defined by claim 15 further comprising an amorphous, inorganic refractory oxide.

20. A hydrocracking process as defined by claim 19 wherein said amorphous, inorganic refractory oxide comprises a dispersion of silica-alumina particles in a gamma alumina matrix.

21. A hydrocracking process as defined by claim 20 wherein said porous, inorganic refractory oxide binder comprises alumina.

22. A hydrocracking process as defined by claim 21 wherein said catalyst comprises one or more nickel hydrogenation components and one or more tungsten hydrogenation components.

23. A hydrocracking process as defined by claim 22 wherein said Y zeolite is LZ-10 zeolite.

24. A hydrocracking process as defined by claim 19 wherein said catalyst contains between about 3 and 20 weight percent of said rare-earth exchanged Y zeolite and between about 30 and 80 weight percent of said amorphous, inorganic refractory oxide.

25. A hydrocracking process as defined by claim 15 wherein said rare earth-exchanged Y zeolite contains at least about 4 weight percent rare earth metals calculated as $RE_2O_3$.

26. A hydrocracking process as defined by claim 14 wherein said catalyst is devoid of pillared clays and layered magnesium silicates.

27. A hydrocracking catalyst comprising:
(a) one or more hydrogenation components; and
(b) a rare earth-exchanged Y zeolite comprising at least 2 wt. % rare earth and having a unit cell size of 24.35 angstroms or below, wherein said rare earth-exchanged Y zeolite is prepared by exchanging a Y zeolite having a unit cell size of 24.35 angstroms or below with rare earth-containing cations, and said Y zeolite contains less than 0.5 weight percent sodium, calculated as $Na_2O$, prior to said rare earth exchange.

28. A hydrocracking catalyst as defined by claim 27 wherein said rare earth-exchanged Y zeolite has a water vapor sorptive capacity less than about 10 weight percent at 25° C. and a $p/p_o$ value of 0.10, and an overall silica-to-alumina mole ratio less than about 6.0.

29. A hydrocracking catalyst as defined by claim 28 further comprising a porous, inorganic refractory oxide binder and a dispersion of silica-alumina particles in a gamma alumina matrix.

30. A hydrocracking catalyst as defined by claim 28 wherein said Y zeolite has a unit cell size between about 24.20 and 24.35 angstroms.

31. A hydrocracking catalyst as defined by claim 28 containing a Group VI metal hydrogenation component selected from the group consisting of molybdenum, tungsten, and the oxides and sulfides thereof and a Group VIII metal hydrogenation component selected from the group consisting of nickel, cobalt, and the oxides and sulfides thereof.

* * * * *